(12) United States Patent
Merzliakov

(10) Patent No.: US 7,626,144 B2
(45) Date of Patent: Dec. 1, 2009

(54) METHOD AND APPARATUS FOR RAPID TEMPERATURE CHANGES

(76) Inventor: Mikhail Merzliakov, 9231 Kingstree Rd., Baltimore, MD (US) 21234

( * ) Notice: Subject to any disclaimer, the term of this patent is extended or adjusted under 35 U.S.C. 154(b) by 283 days.

(21) Appl. No.: 11/535,984

(22) Filed: Sep. 28, 2006

(65) Prior Publication Data
US 2007/0206654 A1 Sep. 6, 2007

Related U.S. Application Data

(60) Provisional application No. 60/721,915, filed on Sep. 29, 2005.

(51) Int. Cl.
*H05B 1/02* (2006.01)
(52) U.S. Cl. ..................... 219/483; 219/497; 219/499; 374/102
(58) Field of Classification Search ............ 219/490, 219/491, 492, 494, 497, 501, 499, 506; 374/101, 374/102, 120, 121
See application file for complete search history.

(56) References Cited

U.S. PATENT DOCUMENTS

| | | | |
|---|---|---|---|
| 5,021,634 A | 6/1991 | Santoro | |
| 5,441,343 A | 8/1995 | Pylkki | |
| 6,079,873 A | 6/2000 | Cavicchi | |
| 6,095,679 A | 8/2000 | Hammiche | |
| 6,132,083 A | 10/2000 | Enala | |
| 6,491,425 B1 | 12/2002 | Hammiche | |
| 6,988,826 B2 | 1/2006 | Zribi | |

OTHER PUBLICATIONS

Lai SL, Ramanath G, Allen LH, Infante P, Ma Z, High-speed (10(4)° C./s) scanning microcalorimetry with monolayer sensitivity (J/m(2)), Applied Physics Letters, Aug. 28, 1995, pp. 1229-1231, v67 (9), Amer Inst Physics, Circulation Fulfillment Div, 500 Sunnyside Blvd, Woodbury, NY 11797-2999 USA.

Heap DM, Herrmann MG, Wittwer CT, PCR amplification using electrolytic resistance for heating and temperature monitoring, Biotechniques, Nov. 2000, pp. 1006-1012, v29 (5), Eaton Publishing Co, 154 E. Central St, Natick, MA 01760 USA.

(Continued)

*Primary Examiner*—Mark H Paschall

(57) ABSTRACT

A method and apparatus for rapid temperature changes of thin samples is disclosed. The apparatus comprises of a thin-film resistive element embedded in a membrane, a narrow gap between the membrane and a heat sink, and a control circuit. The resistive element acts both as a heater and as a temperature sensor to reduce time constant of the control circuit. The gap between the membrane and the heat sink is filled with gas (e.g., $N_2$ or He) acting as cooling medium with low thermal inertia. The temperature controller has a microsecond time constant, which allows adjusting rapidly the power applied to the membrane, depending on heat released/absorbed by a sample during an isotherm or during a given rate of temperature changes. The membrane has low thermal inertia and, coupled with high-speed temperature controller, allows controlled cooling and heating rates up to 100 000 K $s^{-1}$ and higher. The method can be a core of any setup where controlled fast temperature-time profile of thin or small sample is desirable. The proposed control circuit can be readily applied to the variety of the existing setups with resistive heater.

20 Claims, 9 Drawing Sheets

OTHER PUBLICATIONS

Minakov AA, Mordvintsev DA, Schick C, Isothermal reorganization of poly(ethylene terephthalate) revealed by fast calorimetry (1000 K s(-1): 5 ms), Faraday Discussions, 2005, pp. 261-270, v128, Royal Soc Chemistry, Thomas Graham House, Science Park, Milton Rd, Cambridge CB4 OWF, Cambs, England.

Mayer E, New method for vitrifying water and other liquids by rapid cooling of their aerosols, Journal of Applied Physics, 1985, pp. 663-667, v58 (2), Amer Inst Physics, Circulation Fulfillment Div, 500 Sunnyside Blvd, Woodbury, NY 11797-2999 USA.

Glazov VM, Yatmanov YV, Methods of super fast cooling of semi-conducting melts in a process of crystallization, Zhumal Fizicheskoi Khimii, 1982, pp. 755-760, v56 (3), Mezhdunarodnaya Kniga, 39 Dimitrova UL., 113095 Moscow, Russia.

Lerchner J, Wolf A, Wolf G, Recent developments in integrated circuit calorimetry, Journal of Thermal Analysis and Calorimetry, 1999, pp. 241-251, v57 (1), Kluwer Academic Publ, Spuiboulevard 50, PO Box 17, 3300 AA Dordrecht, Netherlands.

Pijpers TFJ, Mathot VBF, Goderis B, Scherrenberg RL, van der Vegte EW, High-speed calorimetry for the study of the kinetics of (De)vitrification, crystallization, and melting of macromolecules, Macromolecules, Apr. 23, 2002, pp. 3601-3613, v35 (9), Amer Chemical Soc, 1155 16th St, NW, Washington, DC 20036 USA.

Efremov MY, Olson EA, Zhang M, Zhang ZS, Allen LH, Probing glass transition of ultrathin polymer films at a time scale of seconds using fast differential scanning calorimetry, Macromolecules 37 (12): 4607-4616 Jun. 15, 2004, Amer Chemical Soc, 1155 16th St, NW, Washington, DC 20036 USA.

Merzlyakov M, Method of Rapid (100,000 K/s) Controlled Cooling and Heating of Thin Samples, The 32nd Annual Conference on Thermal Analysis and Applications, North American Thermal Analysis Society (NATAS), Monday, Oct. 4, 2004, Williamsburg Marriott, Williamsburg, Virginia USA.

Kraftmakher YY, Modulation calorimetry and related techniques, Physics Reports-Review Section of Physics Letters 356 (1-2): 1-117 Jan. 2002, Elsevier Science BV, PO Box 211, 1000 AE Amsterdam, Netherlands.

Cahill DG, Pohl RO, Thermal-conductivity of amorphous solids above the plateau, Physical Review B 35 (8): 4067-4073 Mar. 15, 1987, American Physical Soc, One Physics Ellipse, College Pk, MD 20740-3844 USA.

Cahill DG, Katiyar M, Abelson Jr, Thermal-conductivity of alpha-sih thin-films, Physical Review B 50 (9): 6077-6081 Sep. 1, 1994, American Physical Soc, One Physics Ellipse, College Pk, MD 20740-3844 USA.

Birge NO, Nagel Sr, Specific-heat spectroscopy of the glass-transition, Physical Review Letters 54 (25): 2674-2677 1985, American Physical Soc, One Physics Ellipse, College Pk MD 20740-3844 USA.

Minakov AA, Mordvintsev DA, Schick C, Melting and reorganization of poly(ethylene terephthalate) on fast heating (1000 K/s), Polymer 45 (11): 3755-3763 May 13, 2004, Elsevier Sci Ltd, The Boulevard, Langford Lane, Kidlington, Oxford OX5 1GB, Oxon, England.

Frochte B, Khan Y, Kneller E, A simple high-speed calorimeter, Review of Scientific Instruments 61 (7): 1954-1957 Jul. 1990, Amer Inst Physics, Circulation Fulfillment Div, 500 Sunnyside Blvd, Woodbury, NY 11797-2999, USA.

Denlinger DW, Abarra EN, Allen K, Rooney PW, Messer MT, Watson SK, Hellman F, Thin-film microcalorimeter for heat-capacity measurements from 1.5-K to 800-K, Review of Scientific Instruments 65 (4): 946-958 Part 1, Apr. 1994, Amer Inst Physics, Circulation Fulfillment Div, 500 Sunnyside Blvd, Woodbury, NY 11797-2999 USA.

Riou O, Gandit P. Charalambous M, Chaussy J, Very sensitive microcalorimetry technique for measuring specific heat of mu g single crystals, Review of Scientific Instruments 68 (3): 1501-1509 Mar. 1997, Amer Inst Physics, Circulation Fulfillment Div, 500 Sunnyside Blvd, Woodbury, NY 11797-2999 USA.

Efremov MY, Olson EA, Zhang M, Schiettekatte F, Zhang ZS, Allen LH, Ultrasensitive, fast, thin-film differential scanning calorimeter, Review of Scientific Instruments 75 (1): 179-191 Jan. 2004, Amer Inst Physics, Circulation & Fulfillment Div, 2 Huntington Quadrangle, STE 1 N O 1, Melville, NY 11747-4501 USA.

Vanherwaarden AW, Sarro PM, Gardner JW, Bataillard P, Liquid and gas micro-calorimeter for (bio) chemical measurements, Sensors and Actuators A-Physical 43 (1-3): May 24-30, 1994, Elsevier Science SA Lausanne, PO Box 564, 1001 Lausanne 1, Switzerland.

Mathot VBF, Thermal analysis and calorimetry beyond 2000: challenges and new routes, Thermochimica Acta 355 (1-2): 1-33 Jul. 31, 2000, Elsevier Science BV, PO Box 211, 1000 AE Amsterdam, Netherlands.

Wunderlich B, Temperature-modulated calorimetry in the 21st century, Thermochimica Acta 355 (1-2): 43-57 Jul. 31, 2000, Elsevier Science BV, PO Box 211, 1000 AE Amsterdam, Netherlands.

Winter W, Hohne GWH, Chip-calorimeter for small samples, Thermochimica Acta 403 (1): 43-53 Jun. 26, 2003, Elsevier Science BV, PO Box 211, 1000 AE Amsterdam, Netherlands.

Adamovsky SA, Minakov AA, Schick C, Scanning microcalorimetry at high cooling rate, Thermochimica Acta 403 (1): 55-63 Jun. 26, 2003, Elsevier Science BV, PO Box 211, 1000 AE Amsterdam, Netherlands.

Merzlyakov M, Integrated circuit thermopile as a new type of temperature modulated calorimeter, Thermochimica Acta 403 (1): 65-81 Jun. 26, 2003, Elsevier Science BV, PO Box 211, 1000 AE Amsterdam, Netherlands.

Adamovsky S, Schick C, Ultra-fast isothermal calorimetry using thin film sensors, Thermochimica Acta 415 (1-2): 1-7 Jun. 7, 2004, Elsevier Science BV, PO Box 211, 1000 AE Amsterdam, Netherlands.

Merzlyakov M, Method of rapid (100 000 K s(-1)) controlled cooling and heating of thin samples, Thermochimica Acta 442 (1-2): 52-60 Sp. Iss. SI, Mar. 15, 2006, Elsevier Science BV, PO Box 211, 1000 AE Amsterdam, Netherlands.

METHOD AND APPARATUS FOR RAPID TEMPERATURE CHANGES

CROSS-REFERENCE TO RELATED APPLICATIONS

This application claims the benefit of Provisional Patent Application Ser. No. 60/721,915 filed 2005 Sep. 29 by the present inventor.

FEDERALLY SPONSORED RESEARCH

Not applicable.

SEQUENCE LISTING OR PROGRAM

Not applicable.

BACKGROUND OF THE INVENTION—FIELD OF INVENTION

This invention relates to thermal analysis tools, specifically to calorimeters, and to hot stages in general.

BACKGROUND OF THE INVENTION

Calorimeters measure heat (or heat flow) released or absorbed by a sample under investigation which is subjected to a given rate of temperature changes or is kept isothermally. Hot stages apply controlled rate of temperature changes to a sample under investigation or keep the sample temperature constant regardless of any thermal processes in the sample, such as crystallization or chemical reaction.

Fast instruments with high cooling and heating rates become more and more important for thermal analysis, as discussed by V. B. F. Mathot (*Thermochim. Acta,* 2000, 355, 1-33), by B. Wunderlich (*Thermochim. Acta,* 2000, 355, 43-57) and by T. F. J. Pijpers, V. B. F. Mathot, B. Goderis, R. L. Scherrenberg and E. W. van der Vegte (*Macromolecules,* 2002, 35, 3601-3613). For example, injection molding, which accounts for approximately one third of all polymer processing, applies cooling rates of 1000 K s$^{-1}$ and higher. To analyze material properties during and after such high cooling rates one needs fast thermal analysis instruments. Another example is energetic materials, which decompose at elevated temperature within millisecond time scale so that current thermal analysis technique cannot capture their reaction kinetics.

Sample Thickness

In order to follow rapid temperature changes the sample must be small, at least in one dimension. Length of thermal waves propagation in a time scale τ is given as $$l = \sqrt{\frac{\kappa \tau}{\pi \rho c_p}} \quad (1)$$

where κ, ρ and $c_p$ are thermal conductivity, density and specific heat capacity of the material, respectively. The time scale for rapid scanning experiments is very short, e.g. τ=1 ms when one wants to scan at 1000 K s$^{-1}$ with 1 K resolution. For typical polymers at τ=1 ms l~5 μm. In this example making the polymer sample thicker than 5 μm would create temperature gradient across the sample larger than 1 K at 1000 K s$^{-1}$. Higher scanning rates, i.e. shorter τ, would result even in larger gradient. Thermal events, like melting, lead to $c_p$ increase (e.g., by a factor of 20 for polycaprolactone) and may further increase temperature gradient within the material, which in turn requires even thinner sample. Note that the same size limitation is applied to other components which have to follow rapid temperature changes: a sample support, a heater, a temperature sensor, all should be thermally thin, i.e. at least one of their dimensions should be comparable or smaller than their thermal wavelengths. Thermal wavelength of the sample support or of the heater is given by the same Eq. (1) with corresponding material parameters κ, ρ and $c_p$ of the sample support or of the heater.

Cooling Medium

Good thermal conducting gas and solid have comparable thermal wave lengths (at τ=1 ms for helium at ambient pressure l~0.23 mm, for copper l~0.19 mm). Put another way: in gaseous or solid cooling media, temperature waves propagate with comparable rates. However, at the same geometry, a gas cooling medium would require approximately three orders of magnitude lower power to achieve the same temperature distribution. Since the sample should be thin, it would not require a lot of cooling power for rapid cooling anyway. Therefore having a gas instead of a solid as a cooling medium is more attractive since it would require much less power to control the sample temperature, which, in turn, would lead to much better resolution of the sample heat flow.

High Heating and Cooling Rates

B. Fröchte, Y. Khan and E. Kneller (*Rev. Sci. Instrum.,* 1990, 61, 1954-1957) achieve heating rates up to 10$^7$ K s$^{-1}$ by Joule heating of metal wires. S. L. Lai, G. Ramanath, L. H. Allen, P. Infante and Z. Ma, (*Appl. Phys. Lett.,* 1995, 67, 1229-1231), M. Y. Efremov, E. A. Olson, M. Zhang, Z. Zhang and L. H. Allen (*Macromolecules,* 2004, 37, 4607-4616), M. Y. Efremov, E. A. Olson, M. Zhang, F. Schiettekatte, Z. Zhang and L. H. Allen (*Rev. Sci. Instrum.,* 2004, 75, 179-191) achieve heating rates up to 10$^6$ K s$^{-1}$ on thin conductive films. V. M. Glazov and Yu. V. Yatmanov (*Zhurnal Fizicheskoi Khimii,* 1982, 56, 755-760) realize cooling rates up to 10$^6$ K s$^{-1}$ and higher by trapping molten Si droplets between two cryogenically cooled metal anvils. E. Mayer (*J. Appl. Phys.,* 1985, 58, 663-667) realizes cooling rates up to 10$^6$ K s$^{-1}$ and higher by spattering water mist against cryogenically cooled metal plate. Scanning microcalorimetry at high cooling rate by S. A. Adamovsky, A. A. Minakov and C. Schick (*Thermochim. Acta,* 2003, 403, 55-63) and by A. A. Minakov, D. A. Mordvintsev and C. Schick (*Polymer,* 2004, 45, 3755-3763) allows cooling and heating rates up to 10$^4$ K s$^{-1}$. In all mentioned methods scanning rate, i.e., the rate of temperature changes, was not controlled. For quantitative thermal analysis, however, it is very important to control actively the scanning rate of the sample so that thermal history would not depend on the amount of sample loaded to the measuring system. Without such control any changes in scanning rate due to varying thermal response of a sample would alter crystallization, melting, reorganization processes, kinetics of chemical reactions, etc. A 'continuous measuring method' (V. B. F. Mathot, *Thermochim. Acta,* 2000, 355, 1-33), in which a single measuring run covers the entire temperature range of interest, imposes high demands on the stability and reproducibility of temperature program. Therefore fast and active, i.e. in real time, control over the sample temperature is the key for a successful thermal analysis method.

Schick's group use thin membrane of a vacuum gauge sensor, containing thin film heater and thermopile, and demonstrate a passive, i.e. not in real time, control of the heating and cooling rates which is made through adjusting a power on the heater by the "trial and error" method (S. A. Adamovsky, A. A. Minakov and C. Schick, *Thermochim. Acta*, 2003, 403, 55-63, A. A. Minakov, D. A. Mordvintsev and C. Schick, *Polymer*, 2004, 45, 3755-3763; A. A. Minakov, D. A. Mordvintsev and C. Schick, *Faraday Discussions*, 2005, 128, 261-270; S. A. Adamovsky and C. Schick, *Thermochim. Acta*, 2004, 415, 1-7). Since the control is passive, actual scanning rate varies up to a factor of 3 during sample crystallization. In addition, because sensor's thermopile is used as a thermometer, it results in 5 ms time resolution limit in isothermal experiments and up to 50 K temperature inaccuracy during temperature scans (50 K=5 ms×10,000 K s$^{-1}$).

Fast Temperature Control

The majority of existing thermal analysis setups has separate heating and temperature sensing components, see, e.g., review by Y. Kraftmakher (*Physics Reports*, 2002, 356, 1-117). Obvious way to improve time response of hot stages or calorimetric measuring cells is to scale down the existing layouts, which also greatly increases sensitivity of the instruments. Nowadays that can be done to the large extend using lithographic technique, which was demonstrated by A. W. van Herwaarden, P. M. Sarro, J. W. Gardner and P. Bataillard (*Sens. Actuators A*, 1994, 43, 24-30), by D. W. Denlinger, E. N. Abarra, K. Allen, P. W. Rooney, M. T. Messer, S. K. Watson and F. Hellman (*Rev. Sci. Instrum.*, 1994, 65, 946-959), by O. Riou, P. Gandit, M. Charalambous and J. Chaussy (*Rev. Sci. Instrum.*, 1997, 68, 1501-1509), by R. E. Cavicchi, G. E. Poirier, J. S. Suehle, M. Gaitan and N. H. Tea (U.S. Pat. No. 6,079,873), by J. Lerchner, A. Wolf and G. Wolf (*J. Therm. Anal. Calorimet.*, 1999, 57, 241-251) and by W. Winter and G. W. H. Höhne (*Thermochim. Acta*, 2003, 403, 43-53). This downsizing indeed improves thermal coupling between the heater and the temperature sensor, but at the same time, it increases parasitic electrical coupling between them. Even when heating and temperature sensing components made electrically insolated, capacitive and inductive coupling is inevitable and become very pronounced at a small scale, especially at short time intervals. Therefore two-component setup for fast temperature control has inherent limitation in speed and accuracy. A possible solution is a use of one-component setup, where the same electrical component, a resistive element, acts as a heater and as a temperature sensor.

Resistive Heater as a Temperature Sensor

The idea to use heating element as a thermometer is not new. There are some methods described in literature, which use a heater as a thermometer. Specific Heat Spectroscopy by N. O. Birge and S. R. Nagel (*Phys. Rev. Lett.*, 1985, 54, 2674-2677) and 3 omega method by D. G. Cahill and R. O. Pohl (*Phys. Rev. B*, 1987, 35, 4067-4073) are well-known techniques that use a thin-film heater as a temperature sensor for heat capacity and thermal conductivity measurements of a sample placed on the heater-thermometer. Measurements are performed by applying oscillating power to the heater-thermometer and by measuring amplitude of third harmonic of oscillating voltage on the heater-thermometer, which is proportional to the temperature oscillations. However there is no active control of the sample temperature in both methods. As the heater is deposited on thick substrate (infinitely thick for temperature waves at frequencies of interest) and sample used is thick (also infinitely thick for the temperature waves), the sample temperature oscillations are much smaller than they could be in case of thermally thin sample and thermally thin substrate, limiting the sensitivity and upper frequency range. D. G. Cahill, M.Katiyar and J. R. Abelson (*Phys. Rev. B*, 1994, 50, 6077-6081) use 3 omega method to measure thermal conductivity of thin films so that the sample is thinner than the temperature wave length but substrate is thick and bulky, resulting the same limitations as standard 3-omega method.

S. L. Lai, G. Ramanath, L. H. Allen, P. Infante and Z. Ma (*Appl. Phys. Lett.*, 1995, 67, 1229-1231), M. Y. Efremov, E. A. Olson, M. Zhang, Z. Zhang and L. H. Allen (*Macromolecules*, 2004, 37, 4607-4616), M. Y. Efremov, E. A. Olson, M. Zhang, F. Schiettekatte, Z. Zhang and L. H. Allen (*Rev. Sci. Instrum.*, 2004, 75, 179-191) use a thin-film heater as a temperature sensor in fast scanning rate microcalorimeter for heat capacity measurements during scanning of temperature. The heater is deposited on thin-film substrate. Known amount of power, usually determined by constant electric current, is applied to the heater and a temperature rise of the heater is measured as a function of time. In spite the possibility to influence the rate of the temperature rise by varying applied current to the heater before an experiment, during the experiment different amount of the same material results in different rate of temperature increase and, therefore, in different thermal history, which complicates the analysis. In addition, since the sensor is placed in vacuum to create near-adiabatic condition for higher sensitivity, only experiments on heating are possible. In this method the membrane passively cools at a rate of 1-2 K ms$^{-1}$, but no measurements are performed on cooling or isothermally.

Resistive Heater as a Temperature Sensor with Temperature Control

As for temperature control applications, Heap and coworkers described a method that uses the resistance of electrolyte to control its temperature (D. M. Heap, M. G. Herrmann, and C. T. Wittwer, *Biotechniques*, 2000, 29, 1006-1012). However this method is relatively slow (heating and cooling rates up to 20 K s$^{-1}$), it allows temperature control of only liquid electrically conductive samples or samples dispersed in such conductive liquid, it is not suitable for heat flow measurements; controlled power to the heater is applied only during isothermal mode of operation; cooling and heating are uncontrolled (free cooling is assisted by forced cold air whereas maximum heating power is applied during heating).

U.S. Pat. No. 5,021,634 discloses a control circuit which uses heating element for temperature sensing. The heating element forms one of the legs of a Wheatstone bridge, temperature is set by a variable resistor in opposite leg of the bridge, and a comparator, connected across opposite nodes of the bridge, turns off current through the bridge when the heating element is above the set temperature. Disadvantage of this scheme is that the desirable temperature is set by a variable resistor, which is fairly adequate for soldering irons but is too slow for high rates thermal analysis. In addition, the control circuit applies current to the heating element in on-off regime rather than continuously, which results in higher power and temperature fluctuations than it would be in continuously operating circuit.

U.S. Pat. Nos. 5,441,343, 6,095,679 and 6,491,425 disclose a scheme to control temperature of a small resistive wire, termed probe, which acts simultaneously as a heater and temperature sensor. In the scheme the probe forms one of the legs of a Wheatstone bridge. A feedback circuit adjusts current through the bridge to minimize difference between probe voltage and voltage on a control resistor, connected to another leg of the bridge. This way the resistance, and therefore the temperature, of the probe stays the same even when the probe is brought in contact with colder sample. Disadvantage of this scheme is that probe temperature is determined by the resistance of the control resistor, which cannot set or vary rapidly in a predetermined way.

U.S. Pat. Nos. 6,095,679 and 6,491,425 also disclose another scheme to control temperature of the probe. In that scheme, the control resistor is substituted by another probe, termed reference probe. The probe, which temperature should be controlled, termed sample probe. The feedback circuit adjusts the current through the sample probe to keep resistance of the sample probe and the reference probe the same, as in previous scheme. This time, however, temperature and the resistance of the reference probe can be varied by varying current through the reference probe. Although the temperature of the reference probe is not affected by a sample under investigation, it still depends on a number of factors, such as ambient gas pressure and composition, proximity and temperature of adjacent heat sinks or heat sources. The actual temperature of the reference probe has to be determined during or after the experiment. It is difficult or impossible to determine in advance which current-time profile to set in order to achieve a predetermined temperature-time profile especially for high rates and short time experiments, where a lot of transient thermal effects come into play. Further limitation of proposed scheme is that two probes, sample and reference, are required, and the whole apparatus is not suitable for cooling experiments.

U.S. Pat. No. 6,988,826 discloses a nano-calorimeter device that is essentially an improvement of Allen method (*Appl. Phys. Lett.*, 1995, 67, 1229-1231; *Macromolecules*, 2004, 37, 4607-4616; *Rev. Sci. Instrum.*, 2004, 75, 179-191) and that follows the same approach of near-adiabatic conditions. As already discussed above, near-adiabatic conditions do not allow isothermal or cooling experiments. U.S. Pat. No. 6,988,826 also discloses a power-compensation scheme and equations to calculate temperature compensation. Proposed power-compensation controls current in the sample cell to match the temperature of the sample with that of the reference cell. Although Eq.(4) in this patent has a typo in it (K should equal to $1/(R_r \cdot I_2)$ and not to $R_r \cdot I_2$), it is clear that this compensation circuit can operate only at a constant current through reference heater so that coefficient K in a control loop stays constant. As a result, this control scheme can realize experiments with only gradually increasing heating rates. Further disadvantage of this power-compensation scheme is that twin-cell differential sensor (with sample and reference heaters) is required.

U.S. Pat. No. 6,132,083 discloses a circuit in which the resistance of the resistive heater, its temperature and current through the resistive heater is controlled by a microprocessor. In general, everyone skilled in the art knows that the resistance of the resistive element can be determined by measuring current through it and a voltage drop on it. It is also well known that the temperature of the resistive heater depends on the power released on it so that the temperature can be controlled by adjusting electrical current through the resistive heater. The practical challenge is how to make these resistance calculations and electrical current adjustments as fast and as accurate as possible. Unfortunately U.S. Pat. No. 6,132,083 does not show an exemplarily embodiment of the control circuit, it just states that microprocessor can make adjustments hundreds times per second. As will be shown below, in real applications signals i.e., voltages and currents through resistive heaters, can vary in MHz rate and faster, which would require millions of these adjustments per second. Moreover, as will be shown below, sensitivity of temperature detection in the proposed circuit would require analog-to-digital converters (ADC) of 20 bit and higher, which presently are not available at MHz rates. In other words, although circuit proposed in U.S. Pat. No. 6,132,083 conceptually looks feasible, practical realization of the circuit for rapid thermal analysis would be unobvious and very challenging. Further disadvantage of the method is that it is not suitable for cooling or isothermal experiments and it is not suitable for samples undergoing exothermal or endothermal changes, such as melting, crystallization or chemical reactions.

In conclusion, to realize fast heating and cooling rates and/or high resolution in time, sample under investigation and sample support should be thermally thin; it is better to use gas rather than solid as a cooling medium because it has much less thermal inertia. Insofar as I am aware, no calorimetric method formerly developed uses the same resistive element as a heater and as a thermometer with active real-time temperature control, where temperature can be set directly and can be varied rapidly. Equally, no calorimetric method or hot stage using thin membranes realizes fast active control of temperature changes and provides active temperature control to keep sample isothermally.

BACKGROUND OF INVENTION—OBJECTS AND ADVANTAGES

Accordingly several objects and advantages of the invention are:

(a) to provide fast (up to 100 000 K s$^{-1}$ and higher) controlled (e.g., linear) cooling and heating rates of a thin sample regardless of thermal events in the sample;

(b) to provide fast (~10 microseconds and faster) switching between temperature ramps or between the ramps and isotherms;

(c) to provide fast (~10 microseconds and faster) active temperature control during isotherms regardless of thermal events in the sample.

Beside calorimetry, the invention can be used in a variety of applications, requiring rapid controlled temperature changes of a sample and in studying of fast thermal processes. Since the sample support has only one electrical component, a resistive element acting as a heater and as a thermometer, it is easier in manufacturing than mutli-component setups, cheaper, more reliable, and more readily to scale down for even faster and more sensitive setup. The whole sensing part can be scaled up as well to be more robust or for applications requiring larger samples. Still further objects and advantages will become apparent from a study of the following description and experimental tests with the accompanying drawing.

SUMMARY

The invention, a method and apparatus for rapid temperature changes, has a resistive element embedded in a thermally thin membrane, a narrow gap between the membrane and a heat sink, and a control circuit. The resistive element acts both as a heater and as a temperature sensor to reduce time constant of the control circuit. The gap between the membrane and the heat sink is filled with gas (e.g., $N_2$ or He) acting as cooling medium with low thermal inertia. The control circuit applies given rate of temperature changes to a sample placed on the membrane or keeps the sample isothermally regardless of thermal events in the sample. The control circuit also can measure the power, released on the heater, which can be used to determine sample thermal properties and kinetics and energies of thermal events in the sample.

DRAWINGS

REFERENCE NUMERALS

Figure 1:
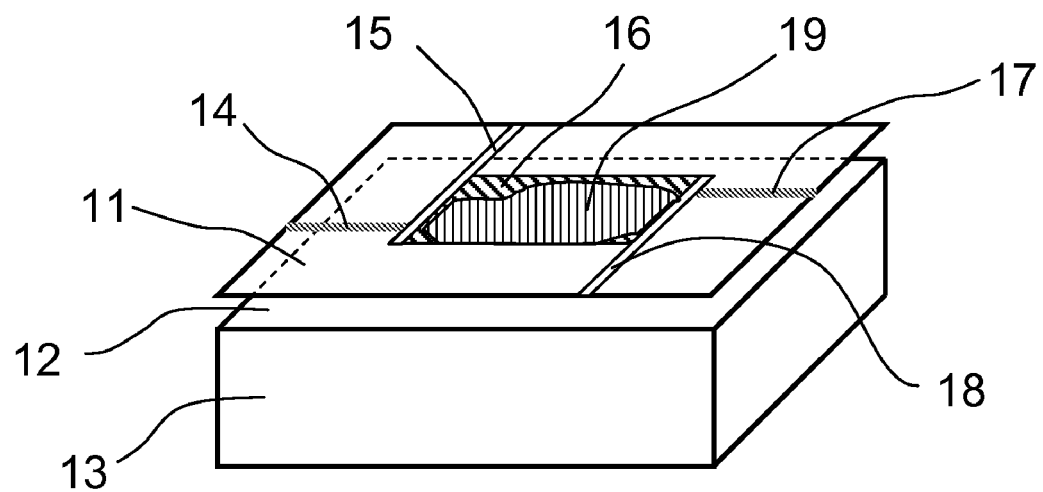
FIG. 1 is a perspective view of a layout of a hot stage or measuring cell for calorimeter.

11 membrane
12 gap filled with gas
13 heat sink
14 and 14a sensing lead
15 and 15a feeding lead
16 and 16a resistive element
17 and 17a sensing lead
18 and 18a feeding lead
19 sample under investigation
20 supporting frame
21 reference resistor
23 differential amplifier for reference voltage
24 differential amplifier for resistive element voltage
25 analog voltage divider
26 differential amplifier

DETAILED DESCRIPTION

Figure 2:
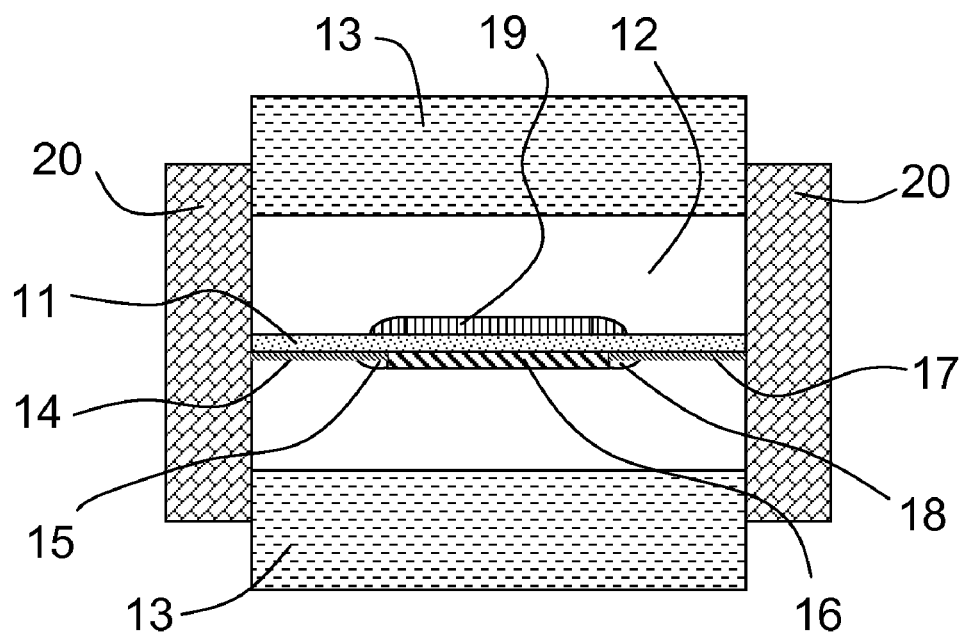
FIG. 2 is a lateral cross-sectional view of the hot stage of FIG. 1. The sizes in vertical direction are exaggerated for clarity, and the whole view is not to scale.

FIG. 1 is a perspective view of a layout of a hot stage or measuring cell of a calorimeter. Sample under investigation 19 can be deposited on membrane 11 on the area, occupied by resistive element 16. Membrane 11 is suspended in the vicinity of heat sink 13 and gap 12 between the membrane and the heat sink is filled with gas. Resistance readings of resistive element 16 should be made with four-poles connection by feeding leads 15, 18 and by sensing leads 14, 17. To minimize possible inductive and capacitive coupling between sensing and feeding leads, the last should be placed normal to each other, as shown in FIG. 1. During operation, rapid heating or cooling of the membrane generates acoustic waves in the gas. These acoustic waves may induce strain in the membrane and strain-induced resistance changes of resisting element 16, which would impair temperature readings. To minimize that effect, the membrane, ideally, should face the heat sink from both sides symmetrically, as shown in FIG. 2. This is a preferred layout of the sensing part of the apparatus. In addition, strain in the membrane can be induced by thermal stresses, thermal mismatch between the membrane and supporting frame 20, and by the sample. This induced strain may alter temperature coefficient of resistance (TCR) of resistive element, which would require careful temperature calibration and interpretation of the resistance data. Note that supporting frame 20 and heat sink 13 does not necessarily form a closed chamber; gas can freely equilibrate between both sides of the membrane 11. If sample 19 is not conductive, it can be deposited directly on the resistive element 16.

There are several possible ways to use a resistive element simultaneously as a heater and as a temperature sensor. One way is to connect the resistive element periodically for a short time to the heater circuit and to the thermometer circuit, using a fast switch, such as field-effect transistor (FET) operating at MHz frequency. Another possibility is to use an analog divider to calculate in real time the resistance of the resisting element at any non-zero current through it; providing large TCR this resistance signal would represent temperature of the resisting element. Existing analog dividers have good accuracy (better than 0.1%) and operate at frequencies up to 10 MHz and higher. Utilizing digital divider at that speed would require very fast analog-to-digital and digital-to-analog converters and would lead to unnecessary circuit complication (ADC→numeric processor→DAC). However in near future digital divider might be the circuit of choice with advantages in flexibility and accuracy.

Figure 3:
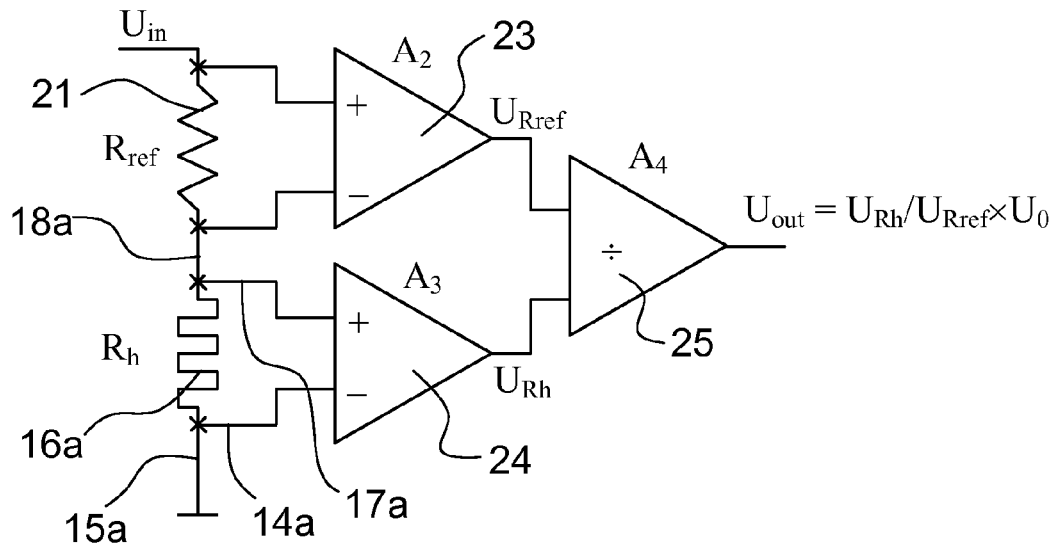
FIG. 3 is a block diagram of voltage divider circuit.

FIG. 3 is a block diagram of the voltage divider circuit. Resistive element 16a is connected to the ground and to reference resistor 21 via feeding leads 15a, 18a and to differential amplifier 24 via sensing leads 14a and 17a. The output of differential amplifiers 23 and 24 equals to the voltage drops $U_{Rref}$ and $U_{Rh}$ on reference resistor 21 and on resistive element 16a, respectively. Analog voltage divider 25 has transfer function $$U_{out} = U_{Rh}/U_{Ref} \times U_0 \quad (2)$$

where $U_0$ is a scaling factor. If resistive element 16a has small geometry (thin film of micrometer thickness or less), relative small current will appreciably affect the temperature of the resistive element, and, therefore, its resistance. Reference resistor 21 is chosen intentionally very bulky compared to resistive element 16a and with very low TCR (<2 ppm K$^{-1}$), i.e. with constant resistance, $R_{ref}$=const, in the whole range of current used. Since resistor 21 and resisting element 16a are in series, $U_{Rh}/U_{Rref} = R_h/R_{ref}$, and therefore, the resistance of resistive element 16a $R_h$ is proportional to $U_{out}$:

$$R_h = R_{ref}/U_0 \times U_{out} \quad (3)$$

Figure 4:
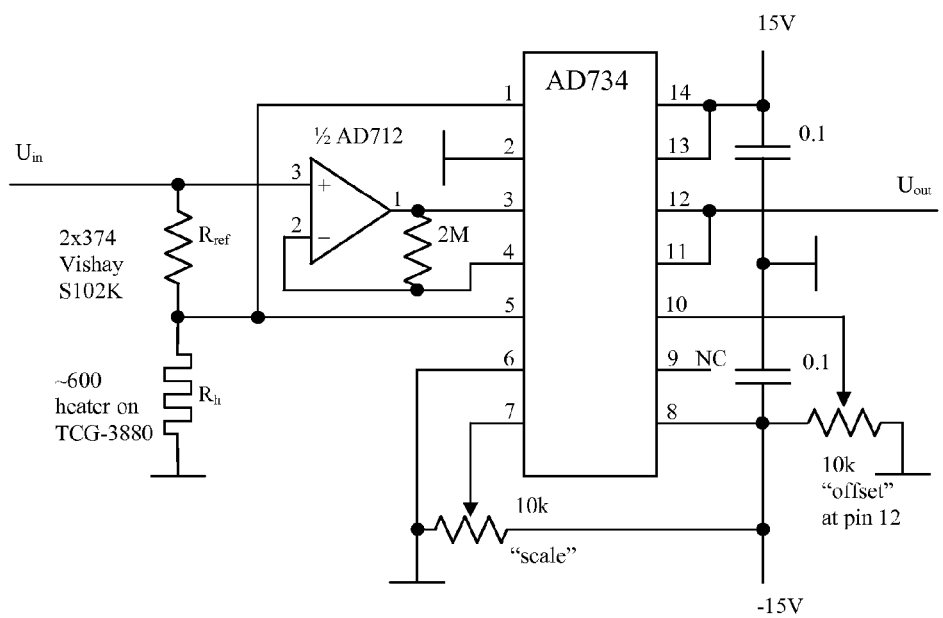
FIG. 4 is an exemplary embodiment of the voltage divider circuit of FIG. 3.

FIG. 4 shows an exemplary embodiment of a voltage divider circuit of FIG. 3. AD734 from Analog Devises, USA, is 10 MHz 4-quadrant analog multiplier/divider. It is connected as a divider with direct denominator control (see AD734 datasheet at http://www.analog.com for details). Relatively large positive offset of $U_{out}$ of the divider can be made lower by trimming the voltage at pin 10 of AD734. The transfer function is $$U_{out} = -U_{pin7} \times R_h/R_{ref} + U_{pin10} \quad (4)$$

where $U_{pin7}$ and $U_{pin10}$ are voltages at pin 7 and pin 10 of AD734, respectively. A thin-film heater in a vacuum gauge TCG-3880, Xensor Integration, The Netherlands, (see TCG-3880 datasheet at http://www.xensor.nl for details) was used as a resistive element.

Figure 5:
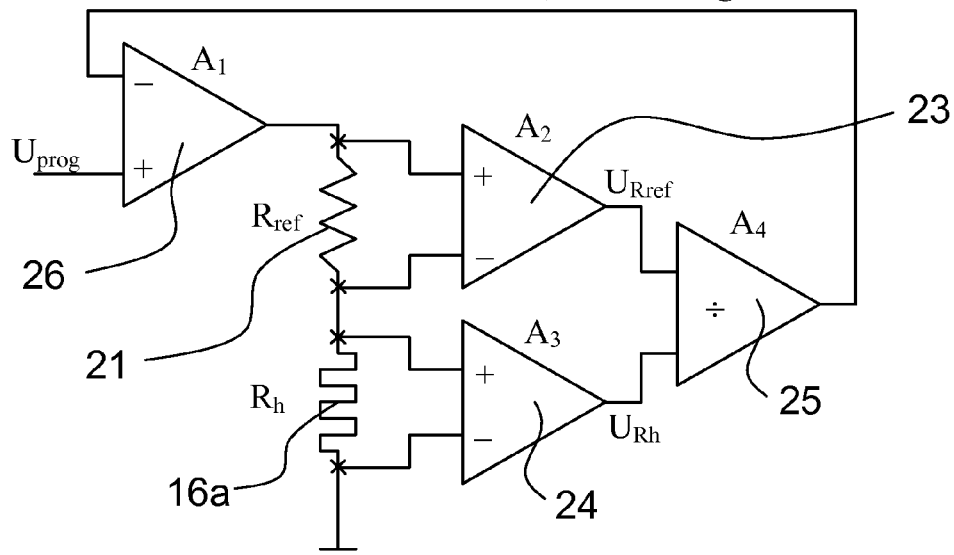
FIG. 5 is a block diagram of temperature control circuit.

FIG. 5 is a block diagram of the temperature control circuit. This is a preferred block diagram of the electrical circuit of the apparatus. In addition to the circuit of FIG. 3, the control circuit has differential amplifier 26, which adjusts the current through the resistor 21 and resistive element 16a to minimize the difference between the $U_{prog}$ and $U_{out}$. Therefore, the resistance variations of $R_h$ are proportional to $U_{prog}$. In first approximation, $R_h$ is a linear function of temperature. Thus, the temperature of resistive element 16a is proportional to $U_{prog}$. For example, varying $U_{prog}$ linearly with time makes temperature of the resistive element also to vary linearly. Non-linear part of $R_h$ temperature dependence can be easily accounted for by adjusting $U_{prog}$ time profile.

Figure 6:
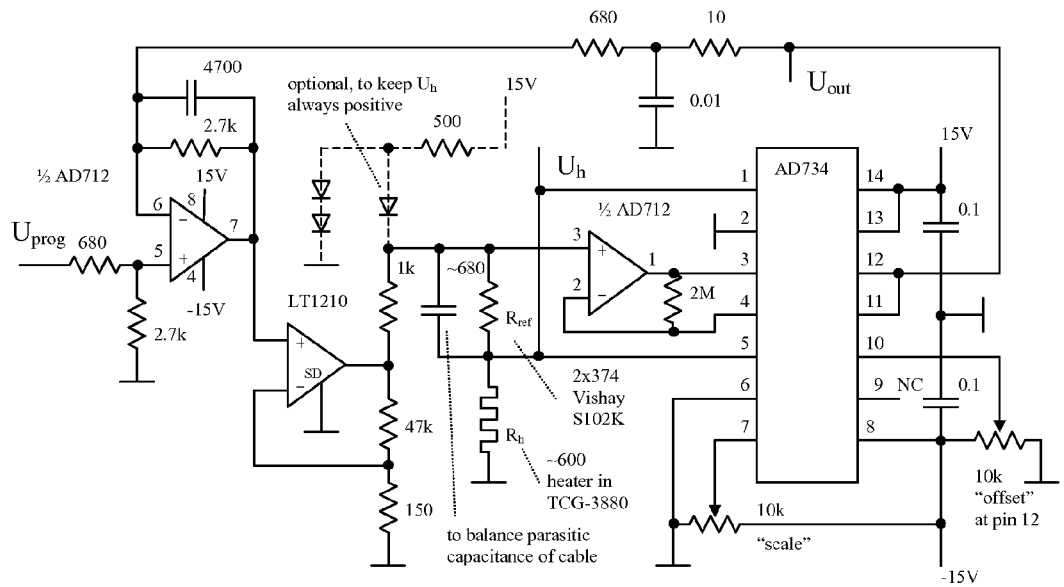
FIG. 6 is an exemplary embodiment of the temperature control circuit of FIG. 5.

FIG. 6 shows an exemplary embodiment of the temperature control circuit of FIG. 5. A thin-film heater in a vacuum gauge TCG-3880 was used as a resistive element. Differential amplifier consists of operational amplifiers AD712 from Analog Devises, USA, and current feedback amplifier LT1210 from Linear Technology, USA, which is needed to drive the resistive element/reference resistor part of the circuit. Reference resistors are Vishay S102K.

Figure 7:
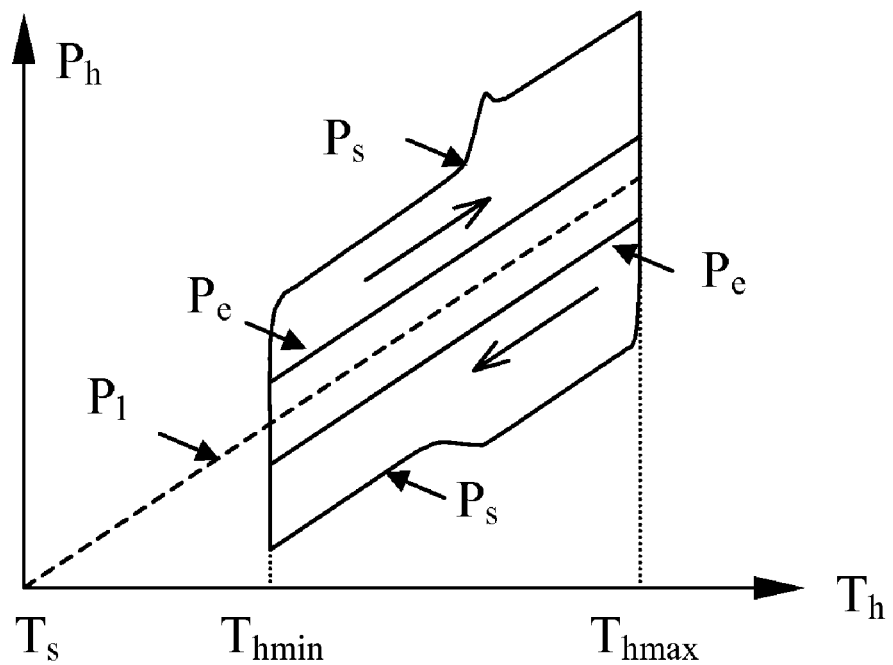
FIG. 7 is a schematic graph of power released on the heater-thermometer versus temperature of the heater-thermometer for empty runs, $P_e$, and sample runs, $P_s$.

FIG. 7 is a schematic graph of power released on the resistive element versus temperature of the resistive element for empty runs (experiments without sample), $P_e$, and sample runs (experiments with sample), $P_s$. Arrows indicate direction of temperature scan. $T_s$ is a temperature of heat sink 13, $P_1$ is a heat leakage via gas. Power released on the heater-thermometer is determined as $P_h = U_{Rh}^2/R_h$, or $P_h \propto U_{Rh} \times U_{Rref}$, or $P_h \propto U_{Rh}^2/U_{prog}$.

Operation

In FIG. 1 and FIG. 2 sample under investigation 19 is placed on membrane 11 on the area covered by resistive element 16. Desirable temperature-time program or desirable temperature for isothermal experiments is set by program voltage $U_{prog}$, for example, from external function generator. There are several modes of operations.

Isothermal Mode

In linear approximation the resistance of the resistive element is proportional to the program temperature: $R_h(T_h) = R_h(T_0) + \alpha(T_h - T_0) = R_{ref} \times U_{out}/U_0 \approx R_{ref} \times U_{prog}/U_0$, where $T_h$ is the temperature of the resistive element, $T_{h\ min} < T_0 < T_{h\ max}$, $R_{ref}$ and $U_0$ are constant, $\alpha$ is TCR of the resistive element. If $U_{prog}$ stays constant, then $T_h$ and the sample temperature remain constant regardless of any heat released/absorbed by the sample. The power released on the resistive element is determined as $P_h = U_{Rh}^2/R_h$, or $P_h \propto U_{Rh} \times U_{Rref}$, or $P_h \propto U_{Rh}^2/U_{prog}$ and can be used to determine exothermal/endothermal heat flow from the sample.

Temperature Scanning Mode

If $U_{prog}$ varies linearly with time between $U_{prog\ min}$ and $U_{prog\ max}$ (a saw-tooth profile), then $T_h$ increases and decreases linearly with time. For resistive element 16 placed at some distance from heat sink 13 in gas (e.g., $N_2$ or He), as shown in FIG. 1 and FIG. 2, a heat leakage via gas $P_1$ in first approximation equals to $K(T_h - T_s)$, where thermal conductance coefficient K depends on measuring cell geometry, gas type and gas pressure. The power released on the empty resistive element $P_e$ depends on scanning rate and is given as $P_e = P_1 + C_e \times dT_h/dt$, where $C_e$ is an effective heat capacity of the membrane and of the resistive element (it may also include parameter of the ambient gas) and $dT_h/dt$ is a scanning rate. The power released on the resistive element loaded with the sample, $P_s$, is given as $P_s = P_e + C_s \times dT_h/dt$, where $C_s$ is an effective heat capacity of the sample.

As can be seen from equations for $P_e$ and $P_s$, heat leakage via gas $P_1$ can be determined at very slow scanning rates, when $dT_h/dt \to 0$. On the other hand, to get higher resolution in $C_s$, scanning rate should be higher. The limiting factor for cooling rate is that $P_s$ should be positive, in other words, cooling rate $|dT_h/dt|$ should be smaller than $P_1/(C_e + C_s) = K(T_h - T_s)/(C_e + C_s)$. Actually, the value of $P_1$ here should be substituted by $P_1 - P_{h\ min}$, where $P_{h\ min}$ is the minimum power, released on the resistive element. This non-zero value comes from non-zero current through the resistive element needed for the divider part of the temperature control circuit to work properly. In real design, $P_{h\ min}$ can be four to five orders of magnitude lower than the maximum power released by the resistive element $P_{h\ max}$, so we can neglect $P_{h\ min}$.

The limiting factor for heating rate is $P_{h\ max}$, so that heating rate cannot be higher than $(P_{h\ max} - P_1)/(C_e + C_s) = (P_{h\ max} - K(T_h - T_s))/(C_e + C_s)$. In order for the circuit to avoid "clipping" (reaching the maximum or minimum of the $P_h$ range) the rate of $U_{prog}$ changes with time should stay within the limit determined by $dT_h/dt$. The value of $U_{prog}$ can vary from $U_{prog\ min} \propto R_h(T_{h\ min})$ to $U_{prog\ max} \propto R_h(T_{h\ max})$. $T_{h\ min}$ should not be very close to $T_s$ to have enough "spare" cooling power, see FIG. 7. The presence of the sample can slightly change the shape of $P_1$ vs $T_h$ (can change the thermal conductance coefficient K), but actual $P_1$ can be measured directly at $dT_h/dt \to 0$.

Temperature Oscillating Mode

In oscillating mode $U_{prog}$, being constant or varying relatively slowly, can be superimposed with small oscillations at some frequency $\omega$ with amplitude $A_U \ll U_{prog}$. Heat capacity $C_s + C_e$ at frequency $\omega$ is proportional to $i\omega A_U/A_{Ph}$, where $A_{Ph}$ is an oscillating part of $P_h$. Averaged values (averaged over the oscillating period) of $U_{prog}$ and $P_h$ can be treated the same way as in scanning mode. This operating mode resembles power-compensated temperature-modulated differential scanning calorimetry method in which actual scanning rate and amplitude of temperature oscillations are not affected by sample thermal response.

"1 omega" Calorimeter

In this mode one can use circuit shown in FIG. 3 and FIG. 4. The temperature controller is omitted, which allows temperature oscillations at even higher frequencies. In this setup $U_{in}$ being constant or varying relatively slowly is also superimposed with small oscillations with amplitude $A_U \ll U_{in}$ at some frequency $\omega$. Oscillating part of $U_{out}$, $A_{Uout}$ is given as $$A_{Uout} \propto 2\alpha \frac{U_{in} A_U (K - P_h \alpha - i\omega(C_s + C_e))}{(K - P_h \alpha)^2 - \omega^2(C_s + C_e)},$$

where $\alpha$ is TCR of the resistive element, $C_s + C_e$ is effective heat capacity of the sample and of the membrane with the resistive element at frequency $\omega$. At high frequencies $$A_{Uout} \propto i 2\alpha \frac{U_{in} A_U}{\omega(C_s + C_e)}.$$

This setup has advantage over 3 omega system: it does not require a Wheatstone bridge with adjustable resistors or a differential amplifier with tunable gain to balance out the basic harmonic. In addition the proposed sensor setup has a thermally thin membrane and a gas as a cooling media and therefore can work at higher frequencies with lower oscillating power input than 3 omega method.

Experimental Tests

In following figures electrical signals were digitized using 12 bit 25 MHz digital storage oscilloscope ADC-212, Pico Technology, UK. Each curve is an average of approximately 100 scans. No slide averaging was applied to any measured curve.

Figure 8A:
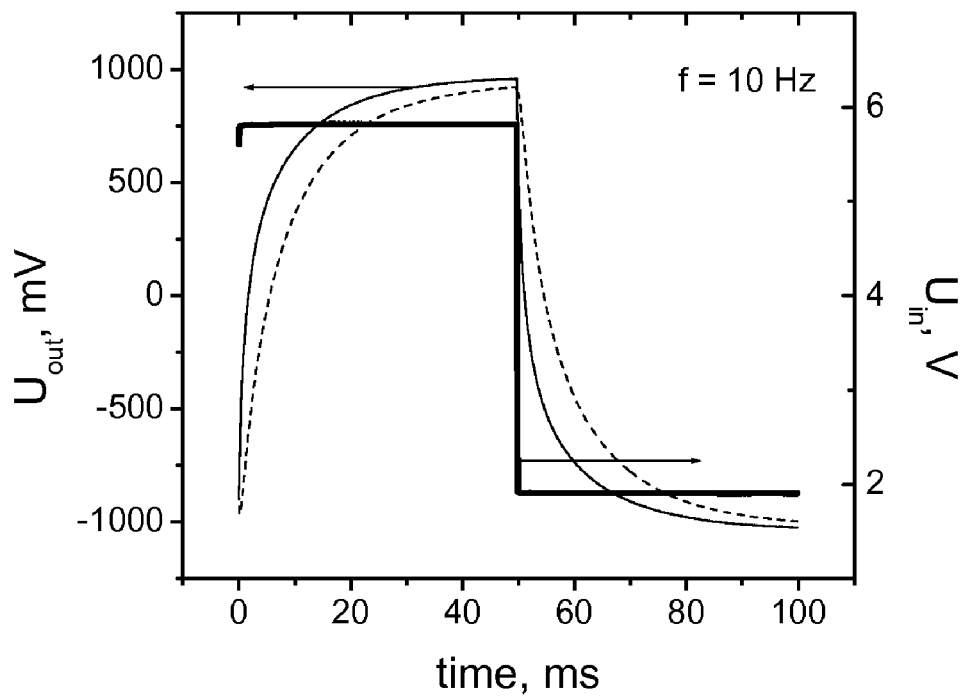
FIG. 8 is an input voltage $U_{in}$, thick lines, and output voltage $U_{out}$, thin lines, versus time at different frequencies of $U_{in}$ oscillations.
Figure 8B:
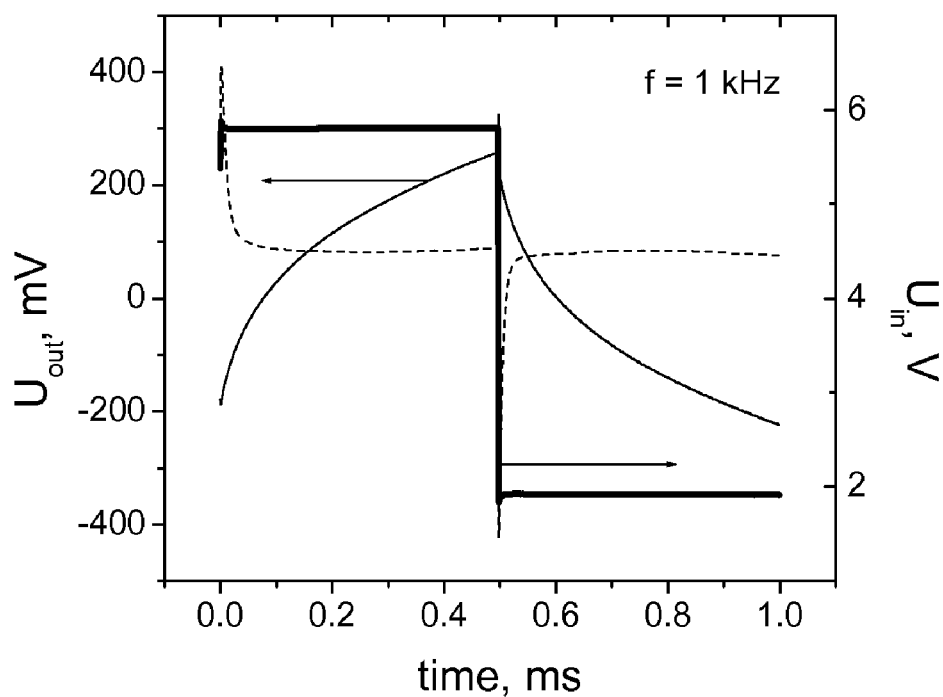
Figure 8C:
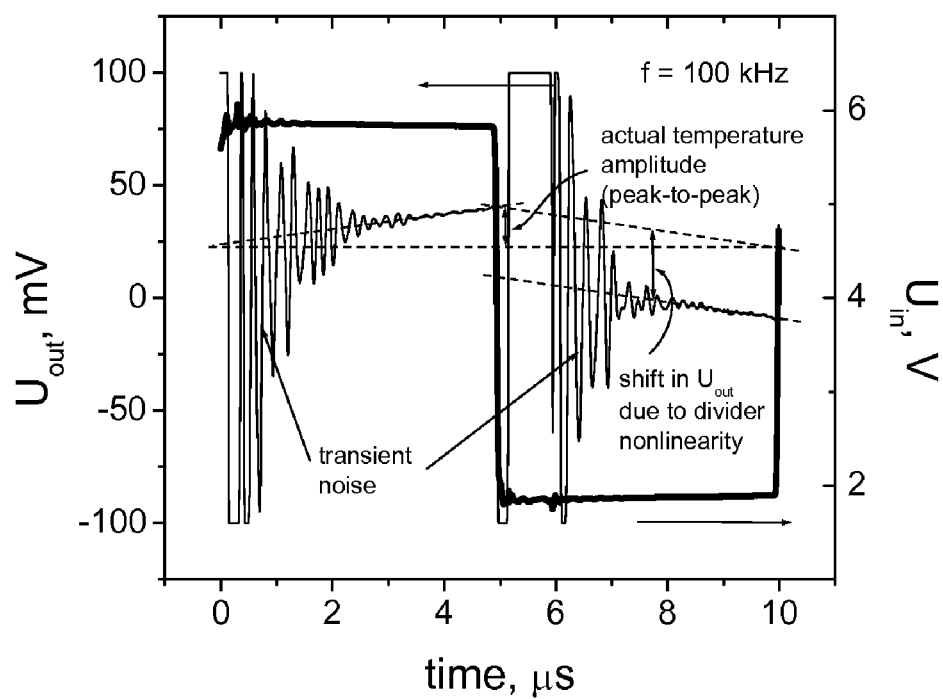

As shown by M. Merzlyakov (*Thermochim. Acta*, 2003, 403, 65-81), thin silicon nitrate membrane of vacuum gauges surrounded by gas allows achieving easily 40,000 K s$^{-1}$ heating and cooling rates with large temperature swings. For first experiments a thin-film heater of a vacuum gauge TCG-3880 was used as a resistive element because a thermopile on the sensor allows monitoring to some extend temperature of the resistive element. FIG. 8 shows two voltage traces, $U_{in}$ and $U_{out}$, during one period of rectangular voltage oscillations of $U_{in}$ for the circuit shown in FIG. 4. $R_{ref}=2\times374$ ohm, $U_{pin7}$ and $U_{pin10}$ were trimmed to $-9.9$ V and $-8.53$ V, respectively. The traces of $U_{out}$ in FIG. 8 correspond to temperature changes of the resistive element. Note that for clarity $U_{out}$ is shown without DC component. Dashed lines in FIG. 8A and FIG. 8B show signal from the thermopile. At the time scale larger than the thermal lag between the resistive element and the hot junctions (which is ~5 ms according to TCG-3880 datasheet) the thermopile signal can represent the temperature of the membrane closed to the resistive element, see FIG. 8A. However, at the time scale shorter than 5 ms the thermopile ceases to pick up any temperature changes of the resistive element. Moreover, thermopile output has glitches every time the input voltage $U_{in}$ changes stepwise, FIG. 8B. This is a signature of capacitive coupling between the resistive element and the thermopile. This parasitic coupling dominates the thermopile output signal and completely misrepresents the temperature of the resistive element at millisecond time scale. On the contrary, the divider signal at the same conditions represents the temperature of the resistive element very clearly without artifacts. Glitches in divider signal $U_{out}$ appears only at much shorter time scale, see FIG. 8C.

On FIG. 8C transient processes in divider signal $U_{out}$ are settled during 3 µs after step-wise changes in $U_{in}$. After that one can see clearly how the temperature of the resistive element rises and falls, depending on the $U_{in}$. Part of $U_{in}$ may actually come through the divider to the $U_{out}$ due to non-linearity of the divider or common mode error. This may account for the offset of $U_{out}$ trace at different $U_{in}$. Actual peak-to-peak amplitude of $U_{out}$ is approximately 18 mV. Time constant of temperature changes is smaller than 3 µs. Time constant of temperature measurements can be estimated as 1 µs or even faster under absence of transient noise, e.g., at constant $U_{in}$. This time constant is a response time when the temperature changes of the resistive element can be picked up by the divider. It is not the time constant for the whole measuring cell (resistive element, membrane, heat sink, gas, etc.) to reach steady state at given input power (which is in the order of a few milliseconds as can be judged from FIG. 8A).

According to the datasheet of vacuum gauge TCG-3880, Xensor Integration, The Netherlands, TCR of its heater equals to 0.6 ohm K$^{-1}$. As reported by S. A. Adamovsky, A. A. Minakov and C. Schick (*Thermochim. Acta*, 2003, 403, 55-63) $R_h$ of TCG-3880 equals to 475 ohm and 706 ohm at 100 K and 500 K, respectively. This results in TCR of 0.5775 ohm K$^{-1}$. The latter value was used for further calculations. In experiments on FIG. 8 one can estimated the sensitivity of the $U_{out}$ to the resistance changes in $R_h$ using Eq.(3) as $U_0/R_{ref}=9.9$ V/748 ohm$\cong13.2$ mV ohm$^{-1}$. Then the sensitivity of the $U_{out}$ to the temperature changes of the resistive element is 13.2 mV ohm$^{-1}$/0.5775 ohm K$^{-1}\cong7.64$ mV K$^{-1}$. Then the peak-to-peak temperature amplitude at 100 kHz (see FIG. 8C) equals to 18 mV/7.64 mV K$^{-1}\cong2.36$ K. This corresponds to the heating and cooling rates of 2.36 K/5 µs$\cong470$ K ms$^{-1}$ or 470,000 K s$^{-1}$. Use of helium instead of nitrogen will allow higher voltage applied to the resistive element and can easily increase heating and cooling rates fourfold resulting in 2 000 000 K s$^{-1}$ heating and cooling rates.

Figure 9:
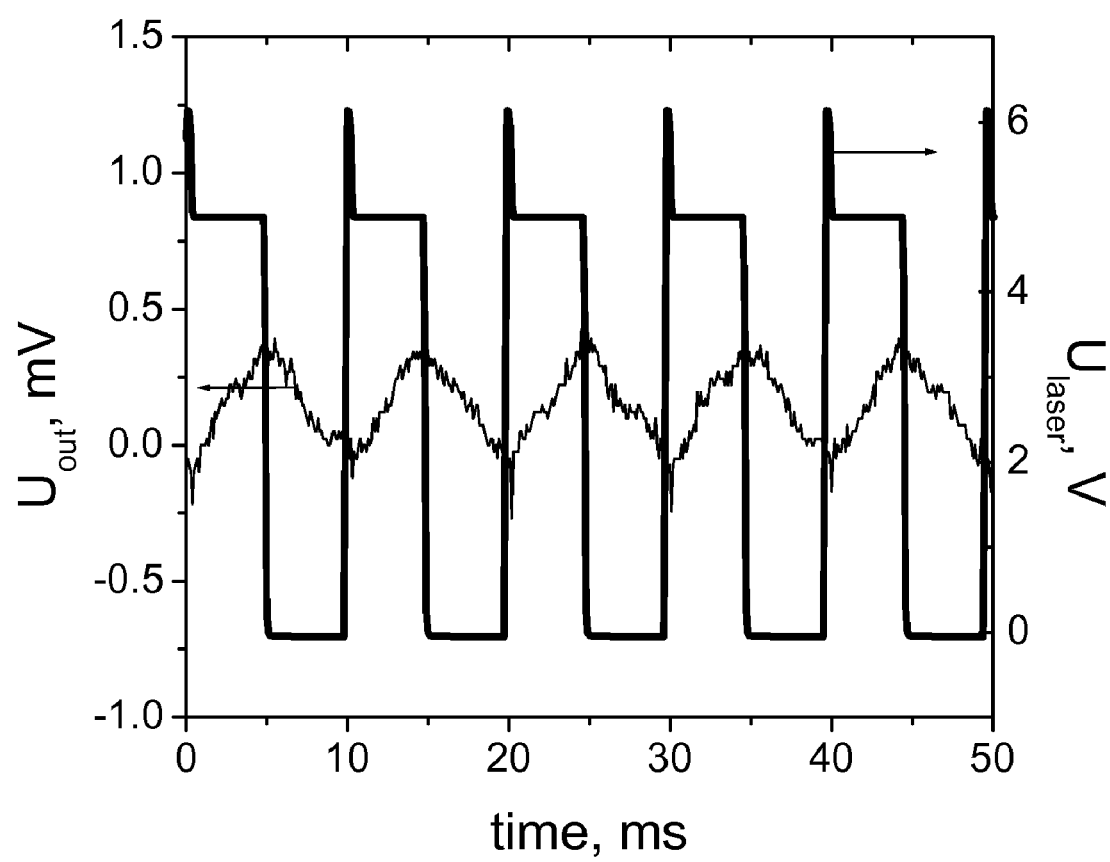
FIG. 9 is a voltage changes on laser diode $U_{laser}$, thick line, and output voltage $U_{out}$, thin line, versus time.

FIG. 9 shows the $U_{out}$ on exposing the membrane of TCG-3880 sensor to a laser diode radiation on frequency of 100 Hz. $U_{in}$ was kept constant. DC component of $U_{out}$ was subtracted for clarity. One can clearly see oscillations of $U_{out}$ with peak-to-peak amplitude ~0.4 mV. This corresponds to peak-to-peak temperature oscillations of 50 mK. The membrane temperature increases or decreases linearly with time, as the laser is turned on or off. The quality of $U_{out}$ allows resolving much smaller amplitudes, approximately two orders of magnitude smaller if one uses selective detection such as a lock-in amplifier. Note that it would require at least 20 bit conversion to achieve similar resolution by analog-to-digital converters instead of analog divider.

Thin-film resistive element embedded in a thin membrane, like heater in TCG-3880 gauge, allows physically inducing and measuring temperature oscillations at frequency of 1 MHz and allows monitoring and controlling temperature changes with time constant of approximately 1 µs. Temperature control circuit, shown in FIG. 6 and tested below, has additional low-pass filter. This filter slows down the response time of the temperature controller but allows handling transient processes, such as seen during step-wise changes of $U_{in}$ in FIG. 8C.

Figure 10A:
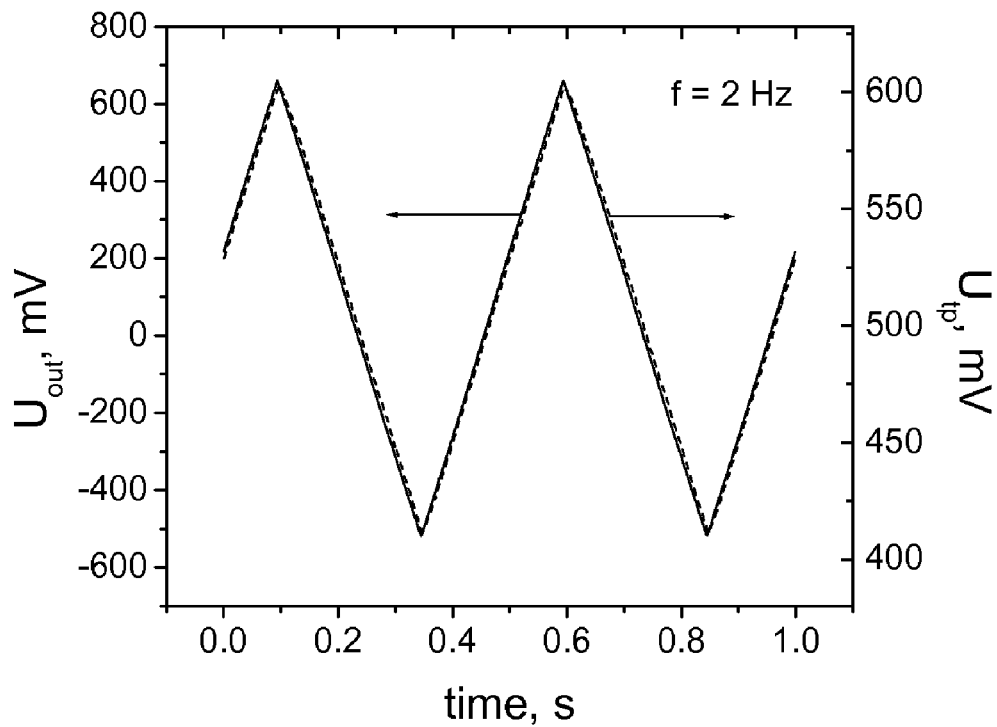
FIG. 10 is a comparison of output voltage $U_{out}$, solid lines, and thermopile voltage $U_{tp}$, dashed lines, versus time.
Figure 10B:
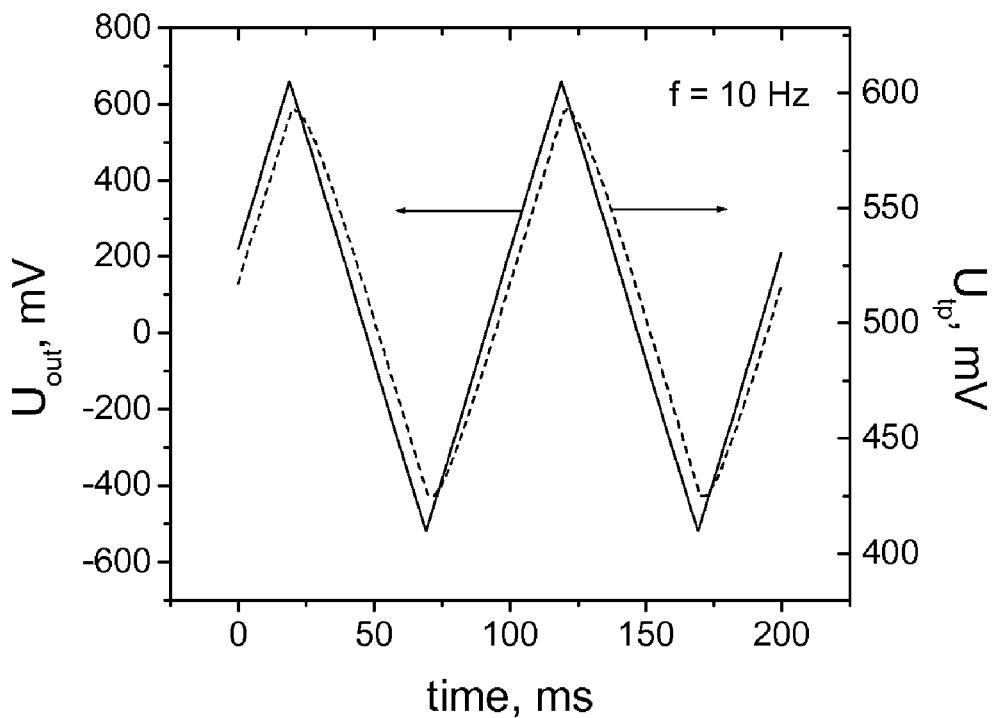

Thermopile of TCG-3880 sensor allows monitoring of heater temperature, providing that rate of $U_{prog}$ changes is low (since thermal lag between hot junctions of the thermopile and the heater is approximately 5 ms). FIG. 10 shows comparisons of the $U_{out}$ and thermopile output voltage $U_{tp}$ at different frequencies of $U_{prog}$ oscillations for the circuit shown in FIG. 6. $R_{ref}=2\times374$ ohm, $U_{pin7}$ and $U_{pin10}$ were trimmed to $-7.3$ V and $-8.73$ V, respectively. The shape of $U_{prog}$ in those experiments was a saw-tooth to realize linear heating and cooling. As one can see, $U_{out}$, and therefore the temperature of the resistive element, indeed changes linearly with time. In FIG. 10B one can see how temperature oscillations of the thermopile lag behind of temperature oscillations of the resistive element.

Figure 11:
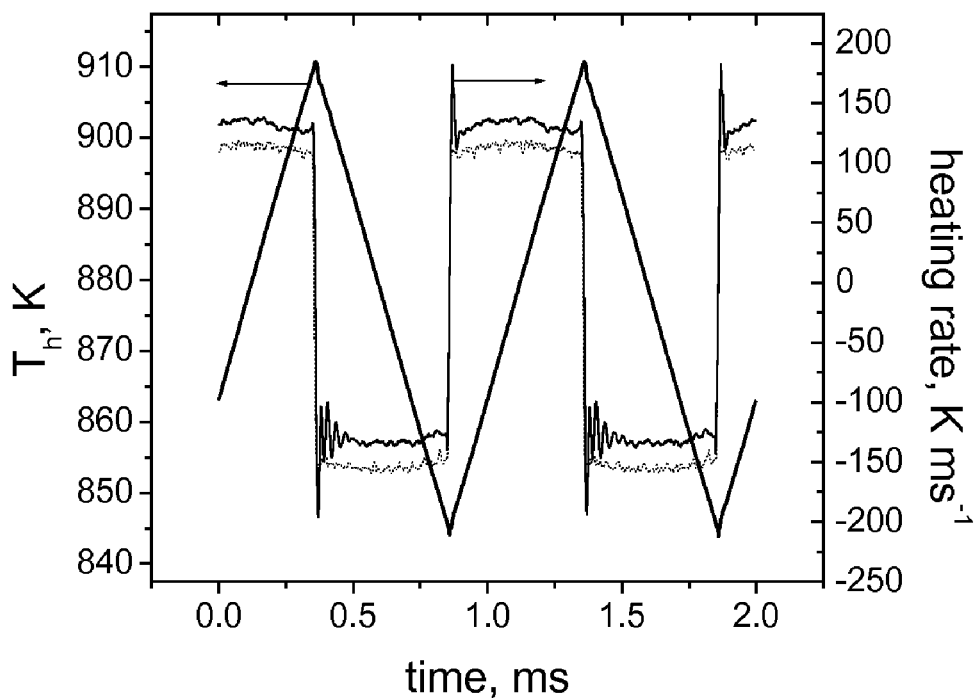
FIG. 11 shows temperature of the heater $T_h$, and heating rate of the heater versus time.

Another example of linear heating and cooling is shown in FIG. 11 which shows temperature of the resistive element $T_h$, and heating rate of the resistive element versus time. Dotted line shows time derivative of program voltage $U_{prog}$ and is vertically shifted for clarity. Temperature of the resistive element $T_h$, was calculated from $U_{out}$ by Eq.(2) and TCR of the resistive element. In this experiment heating and cooling rates are constant and equal ~130 000 K s$^{-1}$. Small gradual deviations in scanning rate during ramps are due to non-ideal shape of saw-tooth ($U_{prog}$) in analog function generator, which was used to drive the control circuit (see dotted line in FIG. 11). There are spikes in heating rates at the beginning of each ramp for ~20 µs caused by transient response of the control circuit. In addition, on switching from heating to cooling the spikes are followed by some oscillations for ~100 µs (over first ~10 K of cooling ramps). This instability is due to divider output signal, which degrades as the feedback of the control circuit tries to drive as low current through the resistive element as possible at the beginning of the cooling ramp. No such instability was observed during switching from cooling to heating ramps.

Figure 12:
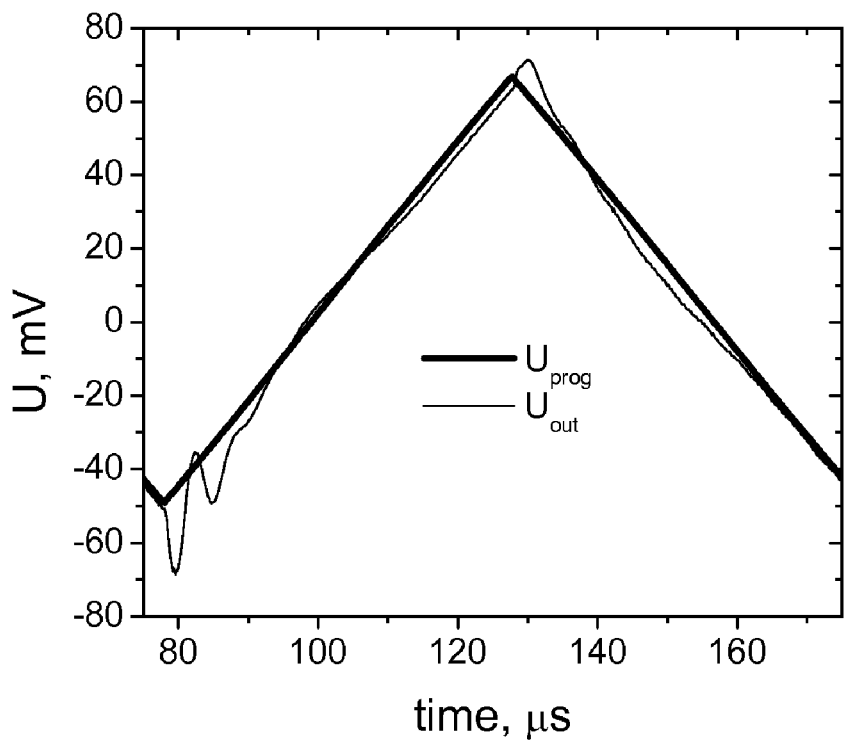
FIG. 12 is a program voltage $U_{prog}$, thick line, and output voltage $U_{out}$, thin line, versus time.

FIG. 12 gives a closer look at transient processes during switching between linear cooling and heating. It shows a program voltage $U_{prog}$, thick line, and output voltage $U_{out}$, thin line, versus time. DC component of $U_{prog}$ and $U_{out}$ was subtracted for clarity. From that figure one can see that time constant of the temperature controller is approximately 10 µs, setting time is approximately 30 µs.

Figure 13:
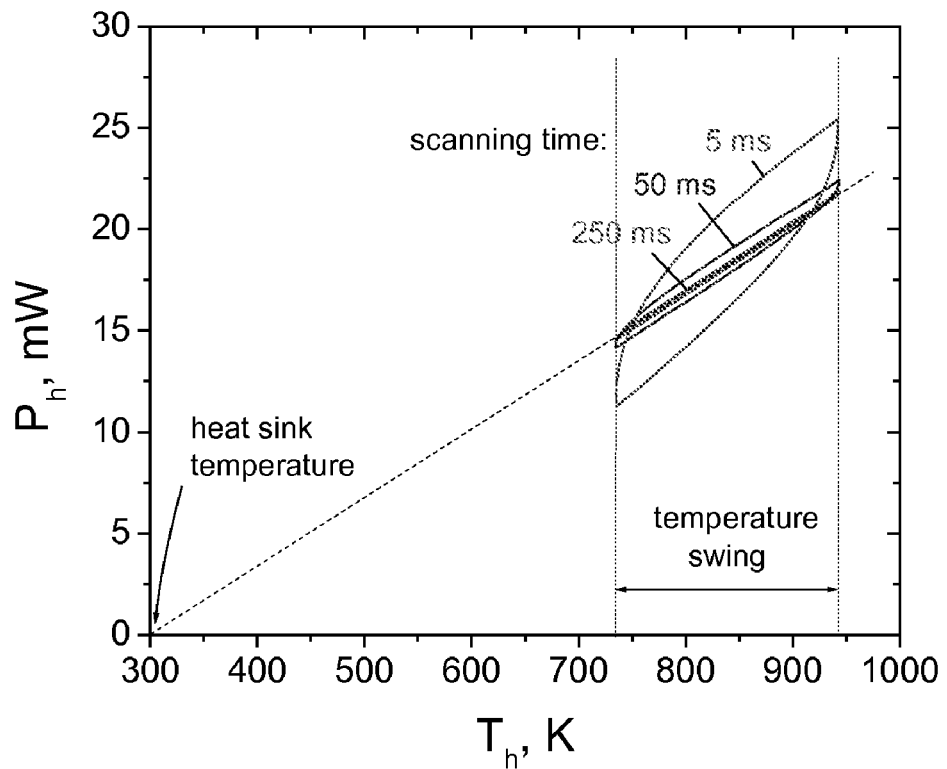
FIG. 13 is a power versus temperature curves of empty heater at different scanning rates in TCG-3880 sensor.

FIG. 13 shows a power released on the resistive element $P_h$ versus temperature of the resistive element $T_h$ at different scanning rates for an empty membrane (without a sample) of TCG-3880 sensor. Scanning time means the time for one temperature ramp. FIG. 13 is similar to FIG. 7 for power profile of empty membrane $P_e$. Note that $P_e$ does not scale linearly with temperature and scanning rate, but it depends on the whole temperature-time profile. This is apparent for TCG-3880 sensor which has a small area, occupied by the resistive element, compared to the whole membrane. In a short time scale, e.g., at the beginning of heating ramp in 5 ms scan, the resistive element has to increase the temperature of only a small portion of the membrane near the resistive element. That is why the heating power is relatively low. Later in the ramp increasingly larger area of the membrane "feels" the temperature increase of the resistive element, resulting in progressively larger heating power needed to keep up with temperature increase. It is difficult to estimate accurately a particular distribution of thermal waves in the membrane and in the gas and its contribution to the total power. However, since the temperature of the resistive element is controlled, temperature waves the resistive element generates are the same with or without a sample allowing accurate determination of the sample heat flow. In experiments on FIG. 13 the resolution of power was approximately 10 µW. At 5 ms scanning time, i.e. at 200 K/5 ms=40 K ms$^{-1}$ heating and cooling rate, the resolution in heat capacity can be estimated as 10 µW/40 K ms$^{-1}$=250 pJ K$^{-1}$.

Figure 14:
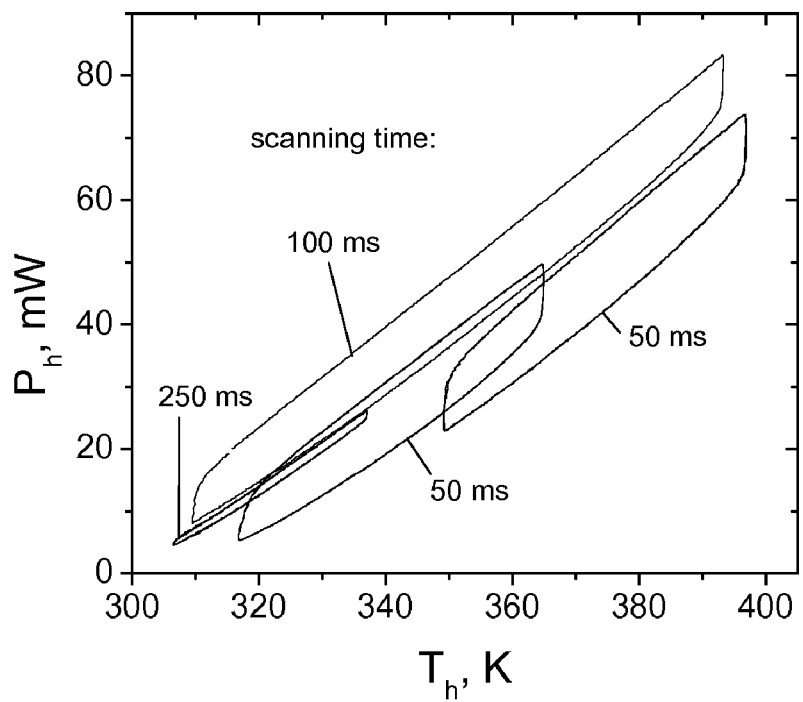
FIG. 14 is a power versus temperature curves of empty heater at different scanning rates in a microcalorimeter sensor.

FIG. 14 is a power released on the resistive element $P_h$ at different scanning rates versus temperature of the resistive element $T_h$ for empty membrane in a microcalorimeter sensor, which is similar to the sensors used by S. L. Lai, G. Ramanath, L. H. Allen, P. Infante and Z. Ma (*Appl. Phys. Lett.*, 1995, 67, 1229-1231), M. Y. Efremov, E. A. Olson, M. Zhang, Z. Zhang and L. H. Allen (*Macromolecules*, 2004, 37, 4607-4616), M. Y. Efremov, E. A. Olson, M. Zhang, F. Schiettekatte, Z. Zhang and L. H. Allen (*Rev. Sci. Instrum.*, 2004, 75, 179-191). Scanning time means the time for one temperature ramp. Heat sink temperature in these experiments depended slightly on temperature scanning interval. Microcalorimeter sensor has much larger area of the resistive element and narrower air gap, compared to TCG-3880 sensor, which leads to larger thermal conductance coefficient (K≅800 µW K$^{-1}$ for microcalorimeter sensor, K≅30 µW K$^{-1}$ for TCG-3880). To get higher rates one needs higher power to drive the resistive element. To increase sensitivity in power readings for that sensor, one has to lower the gas pressure.

CONCLUSION, RAMIFICATIONS, AND SCOPE OF INVENTION

The same resistive element can be successfully used as a heater and as a temperature sensor in a setup with active temperature control. The apparatus allows adjusting rapidly the power applied to the heater depending on heat released/absorbed by a sample during an isotherm or during a given rate of temperature changes. The apparatus allows controlled cooling and heating rates up to 100 000 K s$^{-1}$ and higher. The method can be a core of any setup where controlled fast temperature-time profile of thin or small sample is desirable.

While above description contains many specificities, these should not be construed as limitations on the scope of the invention, but rather as an exemplification of preferred embodiments thereof. Many other variations are possible. For example:

(a) Temperature-time profile can be any periodic or a periodic function; it can consists of sharp temperature steps to generate a spectrum of temperature waves or it can change very gradually to accurately determine phase transitions in sample under investigation.

(b) To minimize lateral temperature gradient across the sample ('cold-edge' effect), another frame-like resistive element can surround the main resistive element and can shield radial heat flow from the sample.

(c) Another membrane with a resistive element can be place on the sample side in the vicinity of and parallel to the sample membrane. If the temperature of the second membrane is kept equal to the temperature of the sample membrane, this would minimize variations in heat losses $P_1$ due to presence of the sample and would minimize temperature gradient in the sample in the direction normal to the membrane. This would also allow to measure powders or other solid samples which are not adhered to the membrane. In addition, second membrane would serve as a protection from evaporation of liquid samples.

(d) Relatively high underlying heat loses $P_1$ and addenda contribution $P_e$ can be compensated by differential setup, i.e. using reference membrane which is identical to the sample membrane but without the sample. This measure would increase sensitivity and reproducibility of heat flow measurements.

(e) One can use a gas medium or a vapor as a sample. In this case measuring heat leakage $P_1$ and addenda contribution $P_e$ provide information about gas thermal properties, which, in turn, can be related to other gas parameters such as pressure, composition, reactivity.

(f) Instead of membrane one can use a sample support which can be shaped as a thin string or a ribbon with a point-like resistive element in the middle. The sample support can be in form of a needle with a point-like resistive element on the tip of the needle. In general, the resistive element and the sample support can be of any geometry as long as they are thermally thin, i.e. their sizes at least in one dimension are comparable or smaller than thermal wave length, defined in Eq. (1).

(g) The sample support with resistive element can be substituted by a resistive film of conducting material or by a ribbon or by a wire. Cross-section of the wire can be hollow to accommodate liquid or volatile samples.

(h) A metal, a semiconductor, a resistive paint, or any other component having electrical resistance that is a function of temperature, can also be used as a resistive element. Resistive element can also be fluid, providing that the sample support will keep structural integrity of the resistive element, for example when the sample support is a capillary tube filled with conductive fluid.

(i) There are applications when the sample is conducting and can play a role of the resistive element by itself. In this case one can use the sample support without resistive element but with some means to electrically connect the sample to the control circuit. An example of such setup would be an electrolyte sample with a thin capillary tube as a sample support.

(j) If necessary, the sample support can be place in vacuum. Thermal link to the heat sink would be via sample support and via radiation. Even in high vacuum, cooling rates could be very high providing low thermal inertia (low heat capacity) of the sample support and a good thermal coupling between the sample support and the heat sink.

(k) Since the sensing part of the proposed method consists of a single resistive element, it allows easily implement multiple resistive sensors in arrays for rapid high-throughput thermal analysis.

(l) The proposed electrical circuit can be readily utilized in the variety of the existing setups with resistive element. Examples can range from temperature controlled soldering iron to nano-calorimeter (U.S. Pat. No. 6,988,826), to scanning thermal microscopy (U.S. Pat. No. 6,095,679).

Accordingly, the scope of the invention should be determined not by the embodiments illustrated, but by the appended claims and their legal equivalents.

The invention claimed is:

1. An apparatus for rapid temperature changes, comprising:
   (a) a sample support possessing an electrical resistance and being thermally thin,
   (b) an electrical circuit for measuring said resistance of said sample support and adjusting heating power released on said sample support so as to make said resistance being proportional to an external control signal, wherein said control signal is selected from the group consisting of voltage and current, wherein said control signal can be varied within microsecond time scale and faster,
   whereby said sample support will be at constant temperature as said control signal is constant
   whereby said sample support will change its temperature as said control signal varies, and
   whereby a sample brought in contact with said sample support will be subjected to temperature changes by varying said control signal, and
   whereby sample thermal properties can be determined from said heating power released on said sample support, and
   whereby said apparatus can realize cooling and heating rates of 100 Kelvin per millisecond and higher and,
   whereby said apparatus can realize switching between different temperature ramps within microsecond time scale and faster, wherein said temperature ramps are selected from the group consisting of heating, cooling and isotherms.

2. The apparatus of claim 1 wherein said electrical circuit comprises:
   (a) a measuring circuit for generating a measuring signal proportional to said resistance at any non-zero electrical current through said sample support,
   (b) a control circuit for minimizing the difference between said measuring signal and said control signal by adjusting said electrical current through said sample support.

3. The apparatus of claim 2 wherein said measuring circuit comprises a voltage divider.

4. The apparatus of claim 3 further including a heat sink disposed in the vicinity of said sample support.

5. The apparatus of claim 4 further including a gas filled between said sample support and said heat sink.

6. The apparatus of claim 5 wherein said sample support comprises a thermally thin membrane with a resistive element integrated into a single unit.

7. The apparatus of claim 1 further including a heat sink disposed in the vicinity of said sample support.

8. The apparatus of claim 7 further including a gas filled between said sample support and said heat sink.

9. The apparatus of claim 8 wherein said sample support comprises a thermally thin membrane with a resistive element integrated into a single unit.

10. The apparatus of claim 1 wherein said electrical circuit comprises analog-to-digital converter, numeric processor and digital-to-analog converter.

11. The apparatus of claim 1 wherein said electrical circuit comprises:
    (a) a monitoring circuit for generating monitoring signal proportional to said resistance at a constant electrical current through said sample support,
    (b) a driving circuit for minimizing the difference between said monitoring signal and said control signal by adjusting driving electrical current through said sample support,
    (c) a switch which rapidly swaps said sample support between said monitoring circuit and said driving circuit.

12. A method for rapid temperature changes, comprising:
    (a) providing a sample support possessing an electrical resistance and being thermally thin,
    (b) providing an electrical circuit for measuring said resistance of said sample support and adjusting power released on said sample support so as to make said resistance being proportional to an external control signal, wherein said control signal is selected from the group consisting of voltage and current, wherein said control signal can be varied within microsecond time scale and faster,
    whereby said sample support will be at constant temperature as said control signal is constant,
    whereby said sample support will change its temperature as said control signal varies, and
    whereby a sample brought in contact with said sample support will be subjected to temperature changes by varying said control signal, and
    whereby sample thermal properties can be determined from said heating power released on said sample support, and
    whereby said method can realize cooling and heating rates of 100 Kelvin per millisecond and higher and,
    whereby said method can realize switching between different temperature ramps within microsecond time scale and faster, wherein said temperature ramps are selected from the group consisting of heating, cooling and isotherms.

13. An apparatus for rapid temperature changes, comprising:
    (a) a sample support possessing an electrical resistance and being thermally thin,
    (b) an electrical circuit for measuring said resistance of said sample support at any stimulus applied to said sample support, wherein said stimulus is selected from the group consisting of electrical current, voltage and power, wherein said stimulus can be varied within microsecond time scale and faster,
    whereby said sample support will change its temperature as said stimulus varies, and
    whereby a sample brought in contact with said sample support will be subjected to temperature changes by varying said stimulus, and
    whereby sample thermal properties can be determined from said stimulus and from said resistance.

14. The apparatus of claim 13 further including a heat sink disposed in the vicinity of said sample support.

15. The apparatus of claim 14 further including a gas filled between said sample support and said heat sink.

16. The apparatus of claim 15 wherein said support comprises a thermally thin membrane with a resistive element integrated into a single unit.

17. The apparatus of claim 14 wherein said sample support comprises a thermally thin membrane with a resistive element integrated into a single unit.

18. The apparatus of claim 13 wherein said electrical circuit comprises a measuring circuit for generating a measuring signal proportional to said resistance at any non-zero electrical current through said sample support.

19. The apparatus of claim 18 wherein said measuring circuit comprises a voltage divider.

20. The apparatus of claim 13 wherein said electrical circuit comprises:

(a) a monitoring circuit for generating monitoring signal proportional to said resistance at a constant electrical current through said sample support,
(b) a loading circuit for driving any electrical current through said sample support,
(c) a switch which rapidly swaps said sample support between said monitoring circuit and said loading circuit.

* * * * *